HENRY NAGLE.

Improvement in Shifting Seats for Vehicles.

No. 120,312.  Patented Oct. 24, 1871.

Witnesses.  Inventor.

UNITED STATES PATENT OFFICE.

HENRY NAGLE, OF CARLISLE, PENNSYLVANIA, ASSIGNOR OF ONE-HALF HIS RIGHT TO BENJAMIN SMELTZ, OF SAME PLACE.

IMPROVEMENT IN SHIFTING-SEATS FOR VEHICLES.

Specification forming part of Letters Patent No. 120,312, dated October 24, 1871.

*To all whom it may concern:*

Be it known that I, HENRY NAGLE, of Carlisle, in the county of Cumberland and State of Pennsylvania, have invented certain Improvements in Shifting Seats for Vehicles, of which the following is a specification:

The first part of my invention consists in the combination of a tongued foot-piece and grooved sill on the bottom of the vehicle for sliding the hind seat backward or forward over the front seat, so as to occupy its place. The second part of my invention relates to so hinging the front seat to its bearings, as to allow it to be turned out of the way for the hind seat to take its place. This combination is peculiarly useful on a certain class of vehicles for carrying produce, &c., converting it into a family conveyance, with two seats, with the greatest ease.

Figure 1:
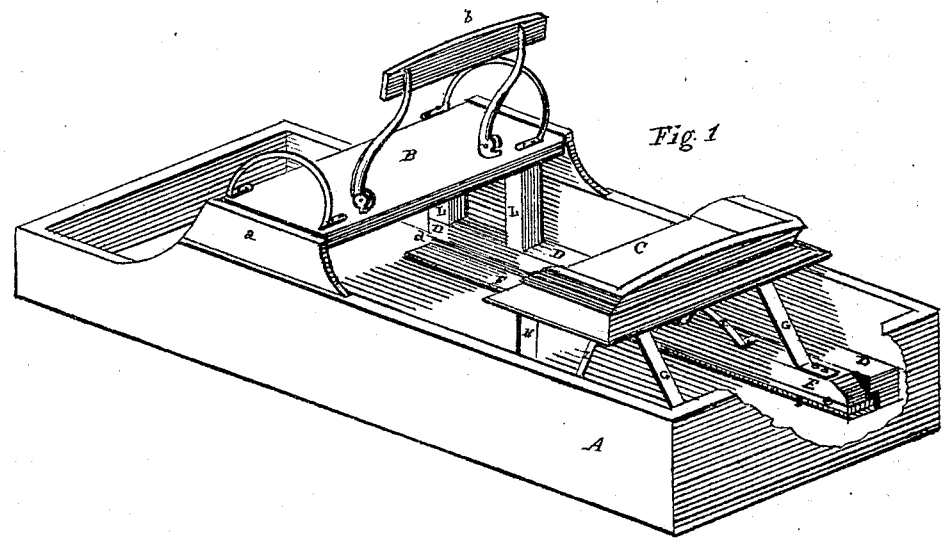
Figure 2:
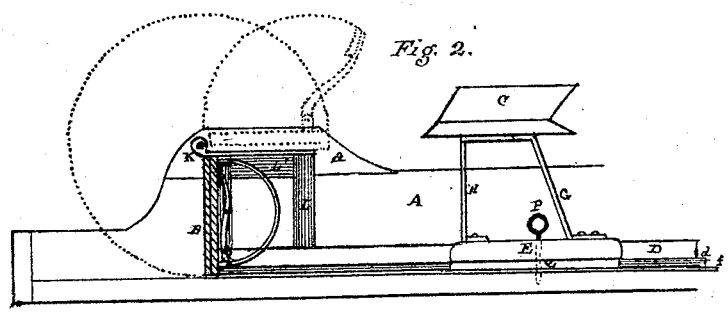
Figure 3:
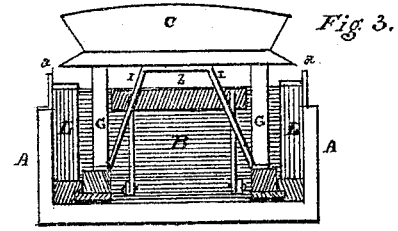

Figure 1 is a perspective view to illustrate both seats in position, a portion of the rear broken out to show sill D with a side groove, $d$, and the seat C, with its supports H G on the foot-pieces E, with the projecting sole $e$ for sliding in the groove $b$. B shows the front seat hinged to the standards L framed together on each side. Fig. 2 is a vertical section. The dotted lines show the change of position; Fig. 3, a view showing the front seat turned under and the back seat pushed over it, so as to form a single seat, as seen from the rear.

A brief explanation will enable any one skilled in the art to make and use the same.

I am aware that, separately considered, there may be no novelty in the parts employed; therefore, I do not claim a folding back or a hinged or sliding seat. The novelty consists in the combined arrangement of the two side sills D with their grooves $d$, and the foot-piece E with its projecting sole or tongue $e$, to which the supporting-brackets and stays G H I are attached, so as to allow the seat C to be pushed forward over the standards L L or supporting parts of the front seat B, as shown by Fig. 3. The front seat B is turned from its horizontal position three-quarters round to a vertical position, as shown in Fig. 2 by the dotted lines, to the folding back and hinged seat, so that when the hind seat is brought forward in the grooved sills, which extend to the front edge of the forward posts L on each side along the bottom of the vehicle, the under side of the front seat shuts up the space, or forms a partition across the front portion of the vehicle, leaving a large square and closed space behind the seat for carrying produce, such as marketing, or the like, while, at the same time, it can be readily converted into a two-seated vehicle for the accommodation of passengers without loss of space, when not in demand, and yet a shifting fixture to the vehicle. To prevent the seat from sliding in the grooves in going up or down hill, the pins P are inserted through the foot pieces E, perforated for the purpose, and into the bottom of the vehicle. The sole $e$ is designed to be cast, and so also the grooved sill, which will make it less bulky than when made of wood, as shown.

The utility of this arrangement is self-evident and desirable for various considerations needless to mention.

What I claim as my invention is—

The arrangement of the two seats, C and B, with the grooved sill D $d$, so combined that the hind seat $c$ can be moved to occupy the space of the front seat B, and which latter, with its folding back $b$, so hinged as to turn over and under to form a partition across the forward part of the vehicle, all operating jointly, substantially in the manner shown, for the purpose specified.

HENRY NAGLE.

Witnesses:
JNO. M. AMWEG,
JACOB STAUFFER.

(31)